(12) United States Patent
Mercz et al.

(10) Patent No.: US 8,602,006 B2
(45) Date of Patent: Dec. 10, 2013

(54) VALVE, ESPECIALLY ROTARY PISTON VALVE, AND EXHAUST GAS RETURN SYSTEM COMPRISING SUCH A VALVE

(75) Inventors: József Mercz, Schwäbisch Gmünd (DE); Jürgen Rosin, Remshalden (DE); Martin Stiegler, Hattenhofen (DE); Gyula Tóth, Budapest (HU)

(73) Assignee: Behr GmbH & Co. KG, Stuttgart (DE)

( * ) Notice: Subject to any disclaimer, the term of this patent is extended or adjusted under 35 U.S.C. 154(b) by 1378 days.

(21) Appl. No.: 11/574,473

(22) PCT Filed: Aug. 30, 2005

(86) PCT No.: PCT/EP2005/009339
§ 371 (c)(1),
(2), (4) Date: Nov. 5, 2008

(87) PCT Pub. No.: WO2006/024495
PCT Pub. Date: Mar. 9, 2006

(65) Prior Publication Data
US 2009/0133660 A1    May 28, 2009

(51) Int. Cl.
*F02B 47/08* (2006.01)
*F02M 25/07* (2006.01)
(52) U.S. Cl.
USPC .............. 123/568.12; 123/568.11; 251/309
(58) Field of Classification Search
USPC ............ 123/568.11, 568.12, 568.23, 268.24, 123/568.24; 251/304, 309; 137/625.47; 137/625.32; 60/605.2
See application file for complete search history.

(56) References Cited

U.S. PATENT DOCUMENTS

| | | | | |
|---|---|---|---|---|
| 485,570 A | * | 11/1892 | Worthington | 261/27 |
| 1,103,842 A | * | 7/1914 | Roberts | 123/190.4 |
| 2,529,544 A | * | 11/1950 | Ebert | 251/162 |
| 3,908,697 A | * | 9/1975 | Witzel | 137/625.47 |
| 4,134,377 A | * | 1/1979 | Bamsey et al. | 123/568.12 |
| 5,009,393 A | * | 4/1991 | Massey | 251/207 |
| 5,669,364 A | | 9/1997 | Everingham | |
| 5,988,147 A | | 11/1999 | Everingham | |
| 6,976,480 B2 | * | 12/2005 | Miyoshi et al. | 123/568.12 |
| 2004/0050374 A1 | * | 3/2004 | Aupperle et al. | 123/568.12 |
| 2005/0103013 A1 | * | 5/2005 | Brookshire et al. | 60/605.2 |
| 2005/0199381 A1 | | 9/2005 | Mercz et al. | |
| 2006/0124114 A1 | * | 6/2006 | Sayers et al. | 123/568.12 |

FOREIGN PATENT DOCUMENTS

| | | |
|---|---|---|
| DE | 198 34 575 A1 | 2/2000 |
| DE | 199 61 756 C1 | 4/2001 |
| DE | 101 33 182 A1 | 1/2003 |
| DE | 697 16 559 T2 | 6/2003 |
| DE | 103 21 638 A1 | 1/2004 |
| DE | 102 43 728 A1 | 3/2004 |
| DE | 103 21 637 A1 | 3/2004 |
| EP | 1 363 013 A1 | 11/2003 |

(Continued)

*Primary Examiner* — Willis R Wolfe, Jr.
*Assistant Examiner* — Anthony L Bacon
(74) *Attorney, Agent, or Firm* — Foley & Lardner LLP

(57) ABSTRACT

The invention relates to a valve, especially a rotary piston valve (1), for controlling the temperature and quantity of the returned exhaust gas in internal combustion engines. Said valve comprises a valve housing (2) and a control element (3) disposed therein which interacts with a valve face (14) configured in the valve housings (2), the control element (3) having a conical surface area (10).

27 Claims, 16 Drawing Sheets

(56) References Cited

FOREIGN PATENT DOCUMENTS

| | | |
|---|---|---|
| GB | 530592 | 12/1940 |
| JP | 2000-054352 A | 2/2000 |
| JP | 2003-194240 A | 7/2003 |
| WO | WO 03/098026 A1 | 11/2003 |

* cited by examiner

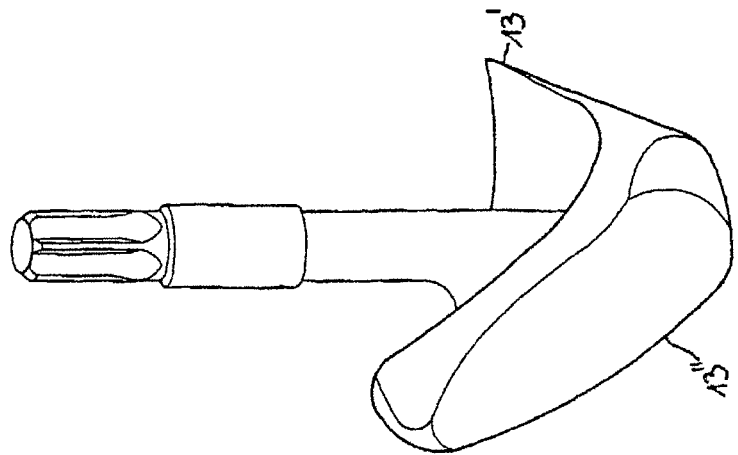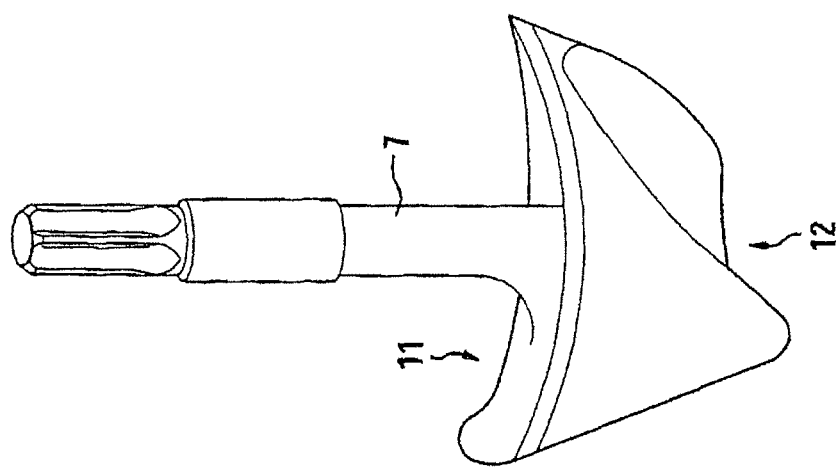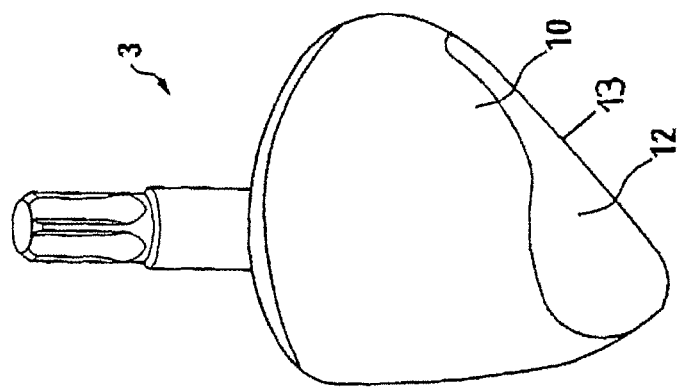

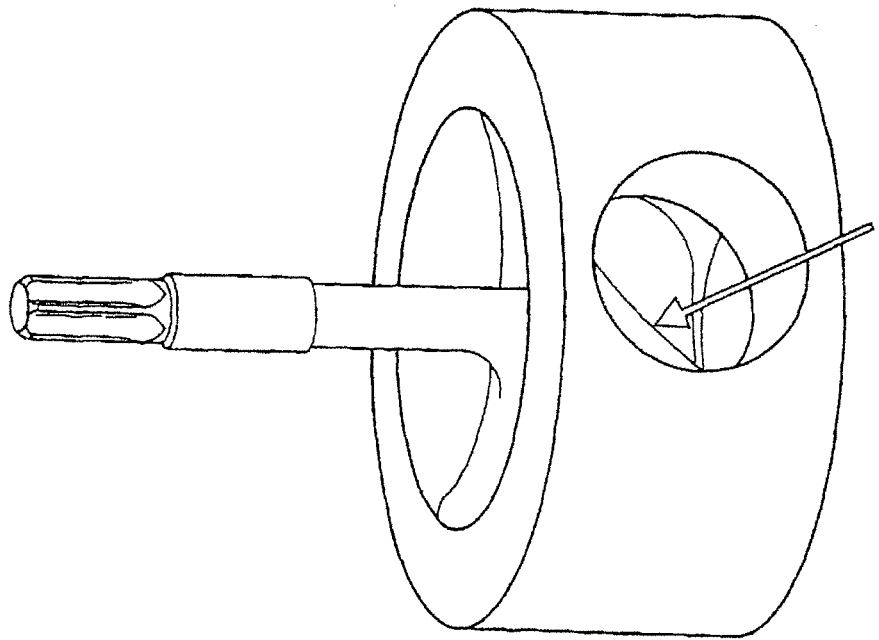
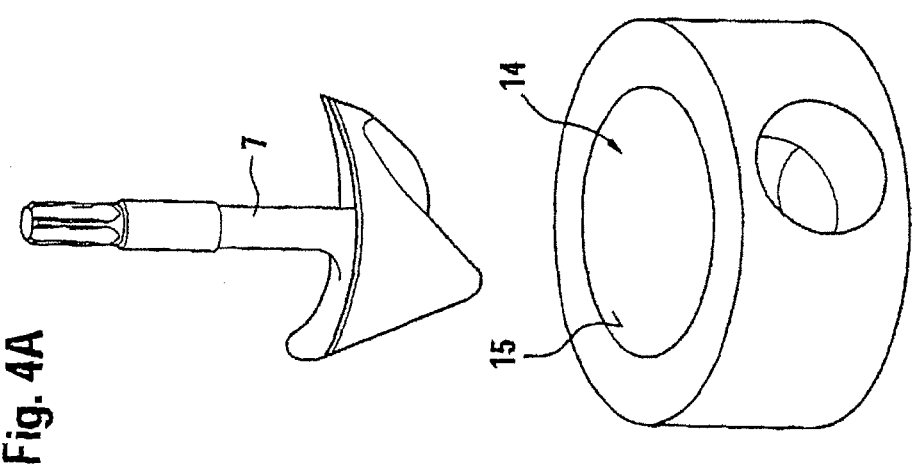
Fig. 4A
Fig. 4B

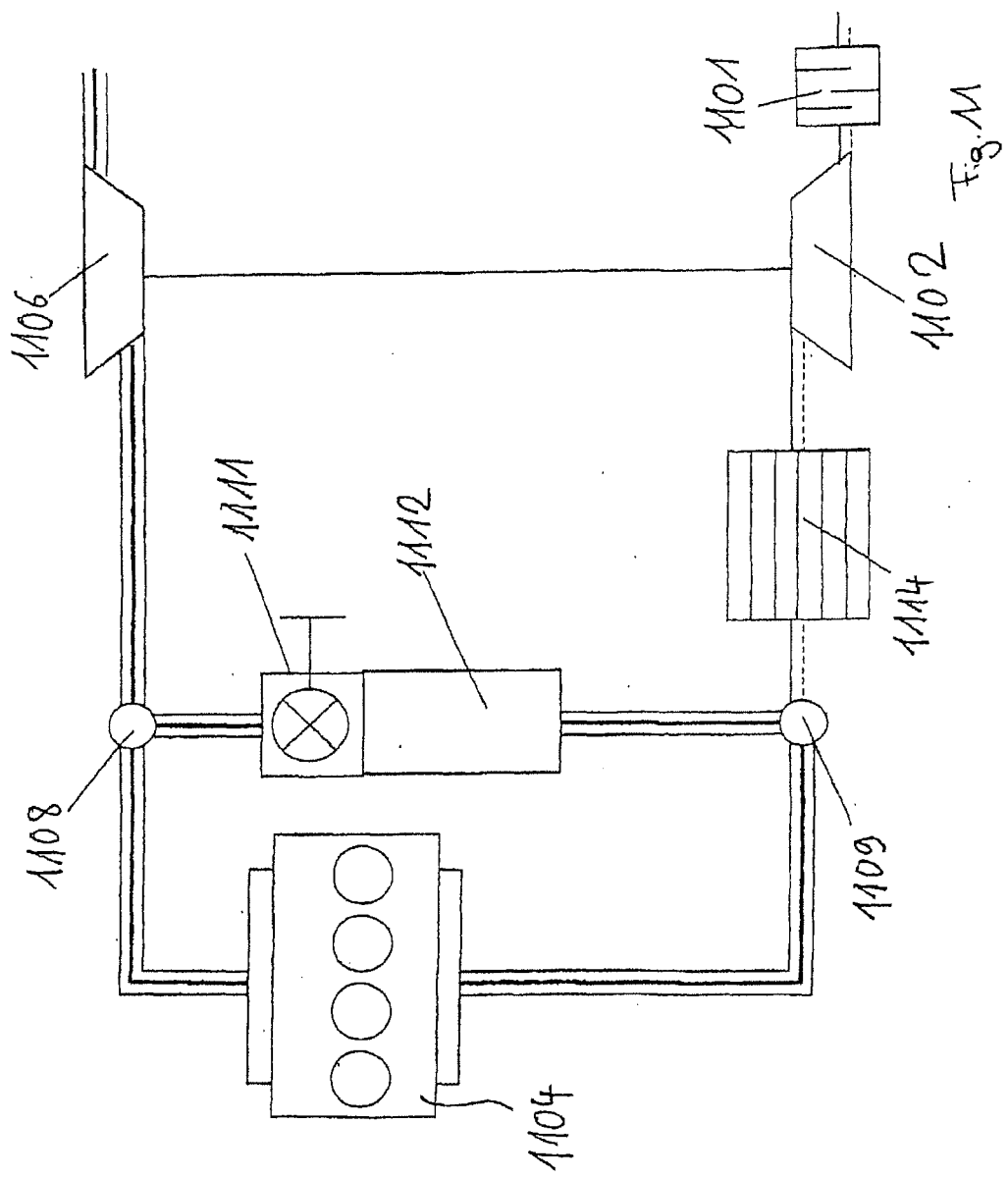

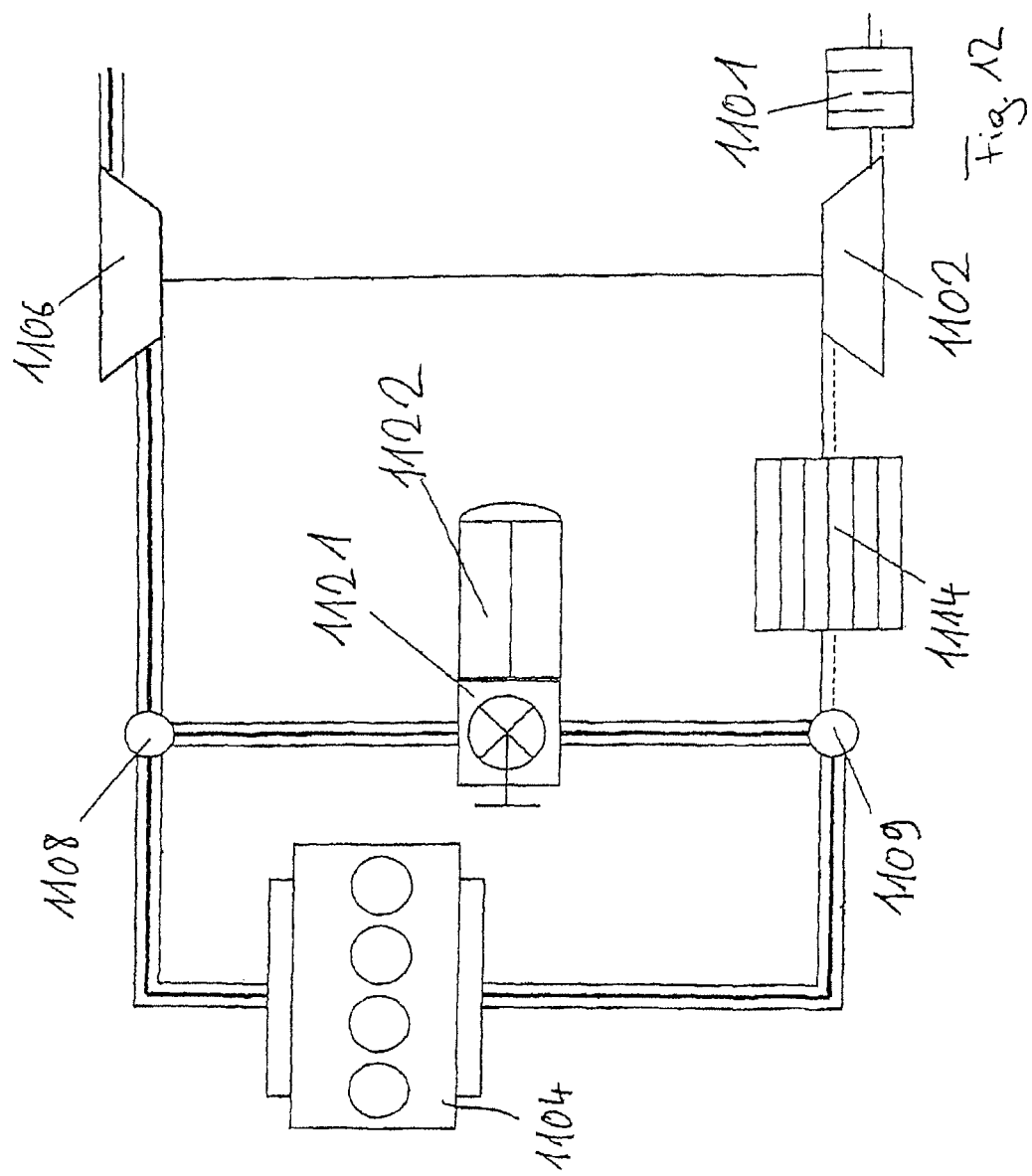

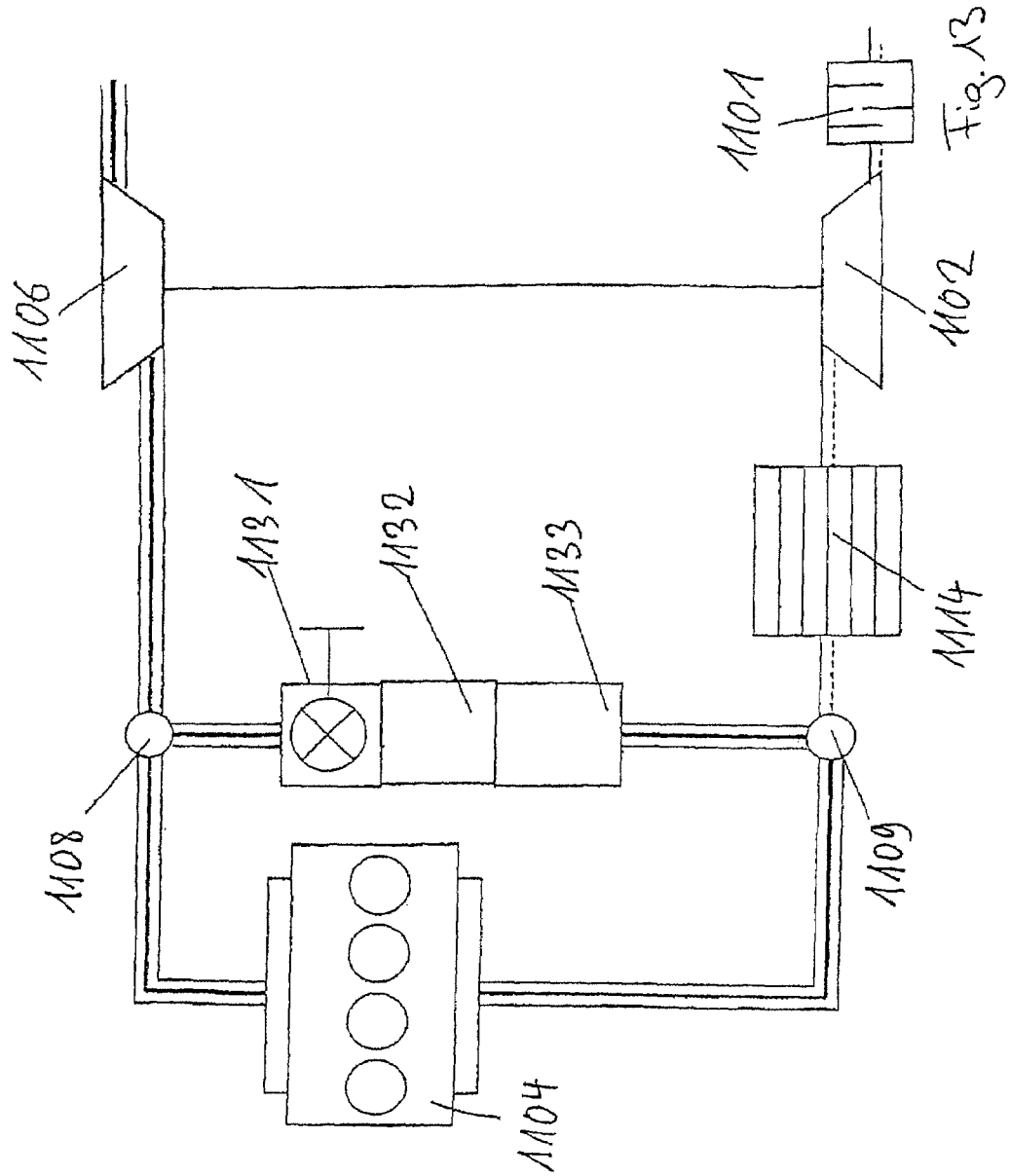

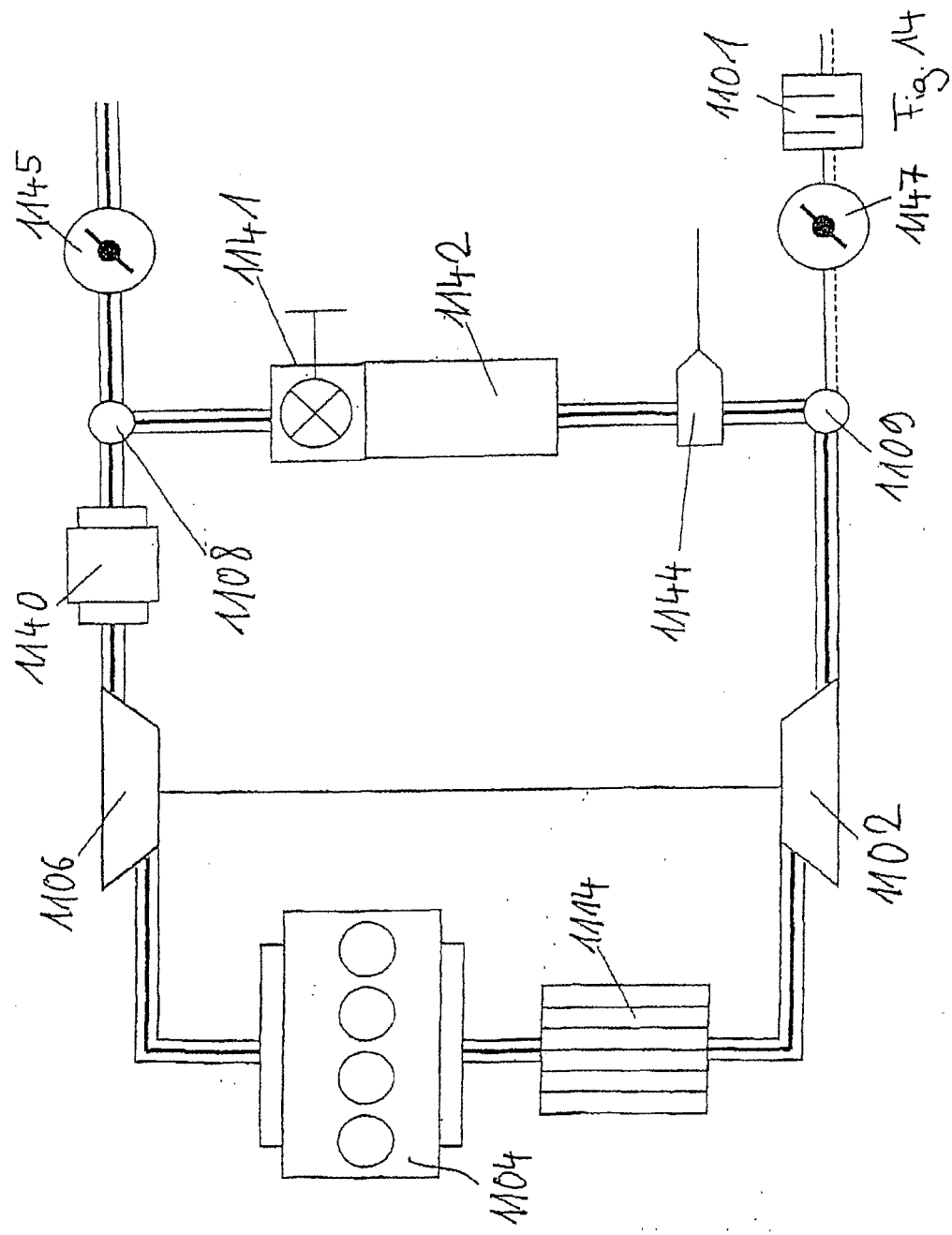

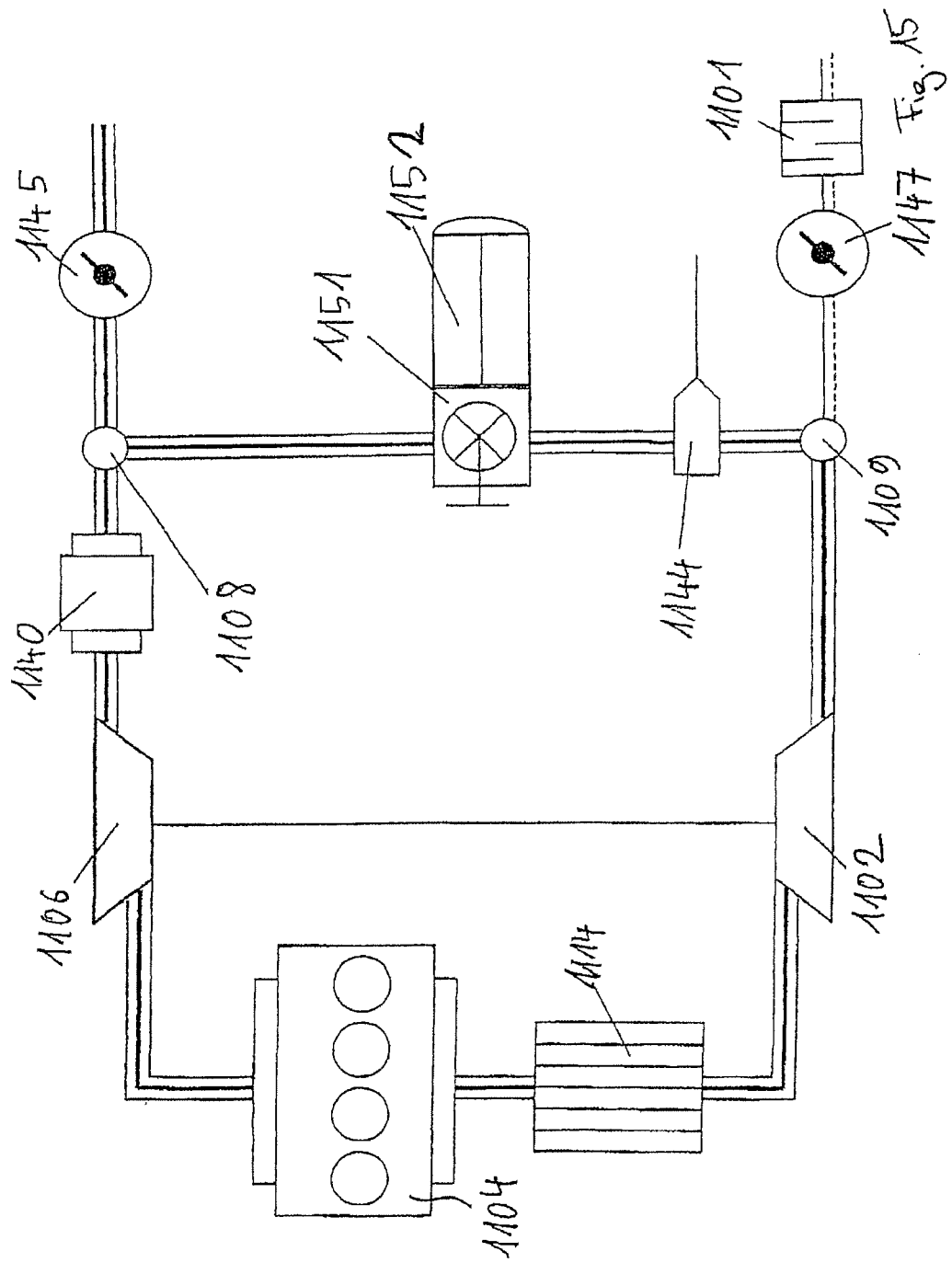

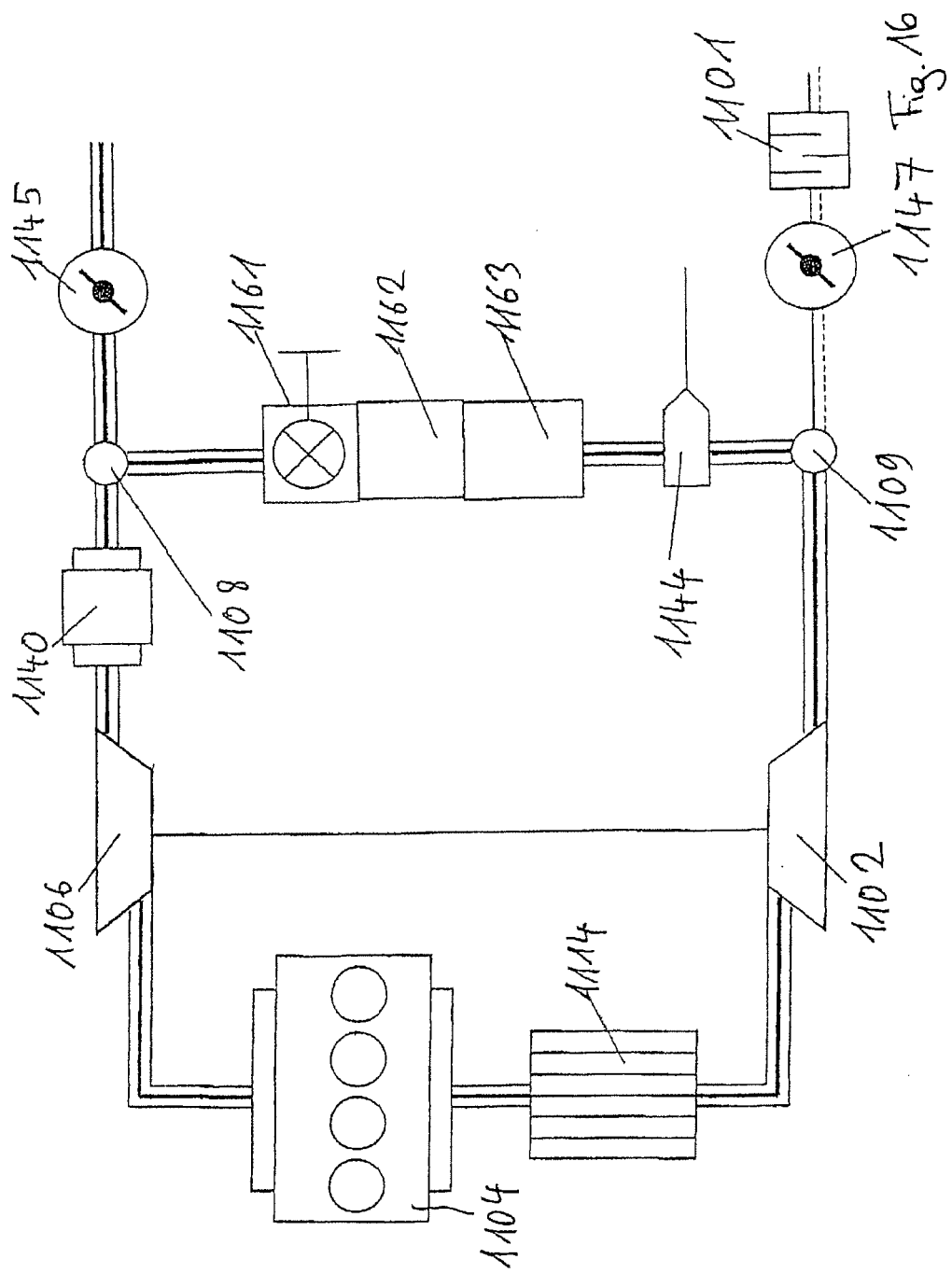

VALVE, ESPECIALLY ROTARY PISTON VALVE, AND EXHAUST GAS RETURN SYSTEM COMPRISING SUCH A VALVE

The invention relates to a valve, especially a rotary piston valve, according to the preamble of claim 1 and to an exhaust gas return system in which at least one corresponding valve is arranged.

DE 103 21 637 A1 discloses a device for regulating the temperature and quantity of the returned exhaust gas in internal combustion engines, in which a valve housing of a regulating valve is linked or connected to a heat exchanger or heat exchanger part. The regulating valve is actuated especially by means of an electric actuation element, to the input of which can be applied an input signal dependent on the engine parameters. The inflow connection of the valve housing is in gas-transmitting connection with an inflow gap or an inflow port. The inflow gap is incorporated into or accommodated in the throughflow space, containing the rotatable/displaceable regulation element, of the valve housing of the regulating valve. The first outflow gap of the throughflow space is connected to the inflow cross section of the exhaust line by means of a transfer space. The second outflow gap of the throughflow space is connected to an inflow cross section of the heat exchanger by means of the distributor space. In the middle position of the rotatable/displaceable regulation element, the inflow gap is closed by means of a surface, such as a surface of a cylinder. In the first activated position, the inflow gap is connected in a gas-transmitting manner to the first outflow gap in the direction of the exhaust line. In the second activated position, the inflow gap is connected in a gas-transmitting manner to the second outflow gap in the direction of the heat exchanger. The regulation element is formed by a body of cylindrical basic configuration which is arranged rotatably in a cylindrical reception space. The body, in the rotatable embodiment is arranged on a valve stem and has two edges for control, the two edges being formed by three-dimensional curves which run on the surface area.

However, a valve of this type still leaves much to be desired.

The object of the invention is to improve a valve of the type initially mentioned.

According to the invention, a valve, especially a rotary piston valve, is provided, which serves for regulating the temperature and quantity of the returned exhaust gas in internal combustion engines, with a valve housing and with a regulation element which is arranged in the latter and which cooperates with a valve seat formed in the valve housing, the regulation element having a conical surface area in contrast to the cylindrical surface area, such as is known from DE 103 21 637 A1. That surface of the valve housing which cooperates with the surface area of the regulation element, that is to say the valve seat, is preferably conically designed correspondingly, that is to say with the same vertex angle, so that a gap-free fit and therefore good sealing off are ensured.

The vertex angle of the cone is preferably 30° to 90°, especially preferably 40° to 50°. The closing action is very good especially in the last-mentioned vertex angle range.

The regulation element is mounted rotatably in the valve housing, and it can preferably also be somewhat displaceable in the longitudinal direction in special angular positions, so that, during actuation, friction is reduced. In this case, the surface areas of the regulation element and of the valve seat are in bearing contact one against the other preferably only in the completely closed state. In all other (opening) positions, there is a small gap between the surface areas. In spite of the gap present in most positions, dirt particles are scraped off during a rotation of the regulation element, so that a clogging of the gap is prevented. In order also to ensure scraping off and at the same time keep friction as low as possible, the regulation element is displaceable in the longitudinal direction by at most 0.5 mm, preferably by at most 0.1 mm, thus resulting in very low gap heights between the surface areas.

Preferably, the valve is actuated with the aid of a pressure-regulated vacuum cell or an electric motor, although any other desired devices for actuation, that is to say for rotating the valve stem, are possible.

The valve stem on which the regulation element is arranged preferably projects through a sleeve which is fixed with respect to the valve housing and which is preferably arranged in a cover connected firmly to the valve housing. The sleeve in this case serves for mounting the valve stem.

The sleeve fixed with respect to the valve housing preferably has, in one end face, a groove which runs in the radial direction and which cooperates with a projecting region which is formed on a disk arranged fixedly in terms of rotation on the valve stem. This allows an automatic mechanical displacement of the valve stem and therefore also the regulation element in the axial direction in the predetermined position. If bearing contact between the surface areas is to be afforded in various positions, then a plurality of grooves may correspondingly be provided. The groove may likewise also be designed to be wider than the projecting region, so that bearing contact between the surface areas is afforded in an angular range, not only in the closing position.

The valve stem preferably has arranged on it at least one spring, especially a cup spring, which by its spring force allows an optimal positioning of the regulation element, but, in the case of corresponding forces, also allows a longitudinal displacement of the valve stem together with the regulation element.

The valve, which has a regulation element arranged rotatably in the valve seat, is designed, according to the invention, in such a way that it regulates the throughflow quantity of the fluid supplied to the valve through a first port, in a first angular position range, with the second port closed, in the form of straightforward regulation of the throughflow to a third port, in a subsequent second angular range in the form of a regulation of the fluid distribution to the second and the third port, and, in the following third angular range, in the form of a straightforward regulation of the free cross section of the second port, with the third port completely closed. In this case, the regulation element arranged rotatably in the valve seat preferably has a conical contour, with the aid of which it closes or releases the first port completely or, preferably continuously, partially.

The relation between the angular position of the regulation element and the cross section released for the throughflow of the fluid is preferably essentially linear in the region of the first angular range and/or of the third angular range, although slight deviations from linearity may occur especially in the initial and/or final region of linear regulation.

Preferably, an absolute maximum of the released cross section between the first and the second angular range is provided. Especially when the valve is used for regulating a returned exhaust gas stream, the presence of a maximum in the case of the complete opening of the outlet to the exhaust gas cooler and the associated slight pressure drop is expedient.

The cross section released overall is preferably essentially constant in the second angular range.

The invention also relates to an exhaust gas return system with an internal combustion engine, especially an engine, which is supplied with exhaust gas branched off at an extraction point and returned via a return point. The object specified above is achieved, in the exhaust gas return system, in that a heat exchanger valve device with a valve described above is inserted between the extraction point and the return point.

A preferred exemplary embodiment of the exhaust gas return system is characterized in that the heat exchanger valve device is connected to an exhaust gas cooling device. The exhaust gas cooling device serves for lowering the temperature of the returned exhaust gas. The heat exchanger valve device may be tied to the exhaust gas cooling device in a materially integral way or mechanically.

A further preferred exemplary embodiment of the exhaust gas return system is characterized in that the heat exchanger valve device is integrated into the exhaust gas cooling device. It is advantageous, for example, if the housing or the outflow side of the heat exchanger valve device forms directly the inlet or outlet diffuser of the exhaust gas cooling device respectively.

A further preferred exemplary embodiment of the exhaust gas return system is characterized in that the heat exchanger valve device is connected in a materially integral manner to the exhaust gas cooling device. Alternatively, the heat exchanger valve device may be connected to the exhaust gas cooling device mechanically.

A further preferred exemplary embodiment of the exhaust gas return system is characterized in that the heat exchanger valve device has a bypass. The bypass serves, for example during a cold start of the engine, for conducting the returned exhaust gas, uncooled, past the exhaust gas cooling device.

A further preferred exemplary embodiment of the exhaust gas return system is characterized in that the exhaust gas cooling device comprises a U-flow cooler. The U-flow cooler is connected to the heat exchanger valve device such that the returned exhaust gas, on the one hand, can be conducted, uncooled, past the cooler by means of the heat exchanger valve device. On the other hand, the returned exhaust gas can be conducted by means of the heat exchanger valve device through the U-flow cooler and thus be returned, cooled. The U-flow cooler affords the advantage that a bypass may be dispensed with.

A further preferred exemplary embodiment of the exhaust gas return system is characterized in that the heat exchanger valve device is arranged upstream or downstream of the exhaust gas cooling device, as seen in the flow direction from the extraction point to the return point. The heat exchanger valve device may consequently be arranged both in front of and behind the exhaust gas cooling device.

A further preferred exemplary embodiment of the exhaust gas return system is characterized in that the heat exchanger valve device comprises a high-temperature exhaust gas cooler and a low-temperature exhaust gas cooler. The two-stage cooling may be advantageous, depending on the application.

A further preferred exemplary embodiment of the exhaust gas return system is characterized in that the heat exchanger valve device is arranged upstream or downstream of the high-temperature exhaust gas cooler or of the low-temperature exhaust gas cooler, as seen in the flow direction from the extraction point to the return point. The heat exchanger valve device may thus be arranged in front of or behind the high-temperature exhaust gas cooler or low-temperature exhaust gas cooler. However, the heat exchanger valve device may also be arranged between the high-temperature exhaust gas cooler and the low-temperature exhaust gas cooler.

A further preferred exemplary embodiment of the exhaust gas return system is characterized in that the exhaust gas return system is formed by a high-pressure exhaust gas return system. The high-pressure exhaust gas return system may be equipped with single-stage or with two-stage cooling.

A further preferred exemplary embodiment of the exhaust gas return system is characterized in that the exhaust gas return system is formed by a low-pressure exhaust gas return system. The low-pressure exhaust gas return system may be equipped with single-stage or with two-stage cooling.

The invention is explained in detail below by means of an exemplary embodiment having various uses in exhaust gas return systems, with reference to the drawing in which:

FIG. 3A-3C show side views of the rotary piston from different angles,

Figure 5:
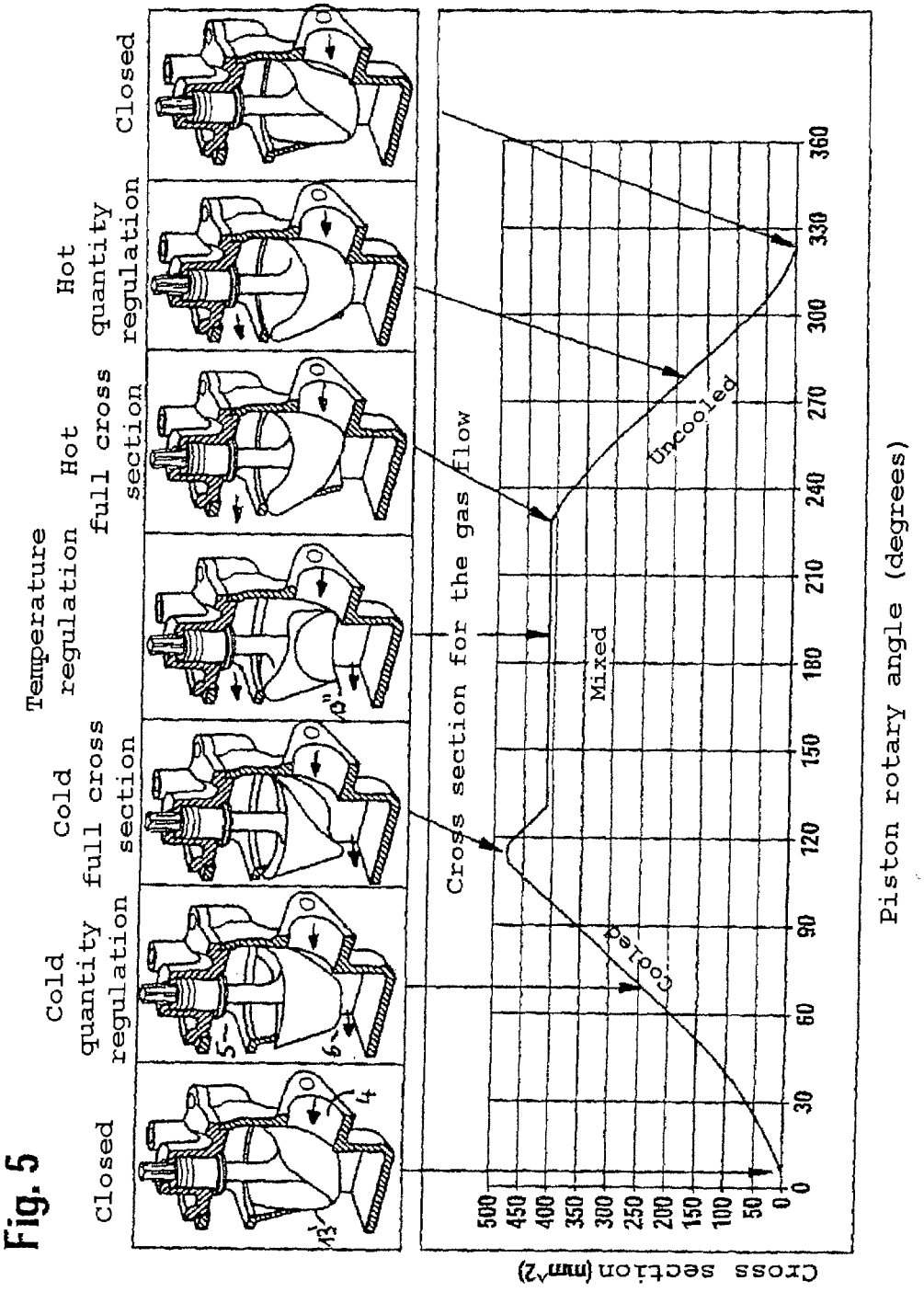
Figure 6B:
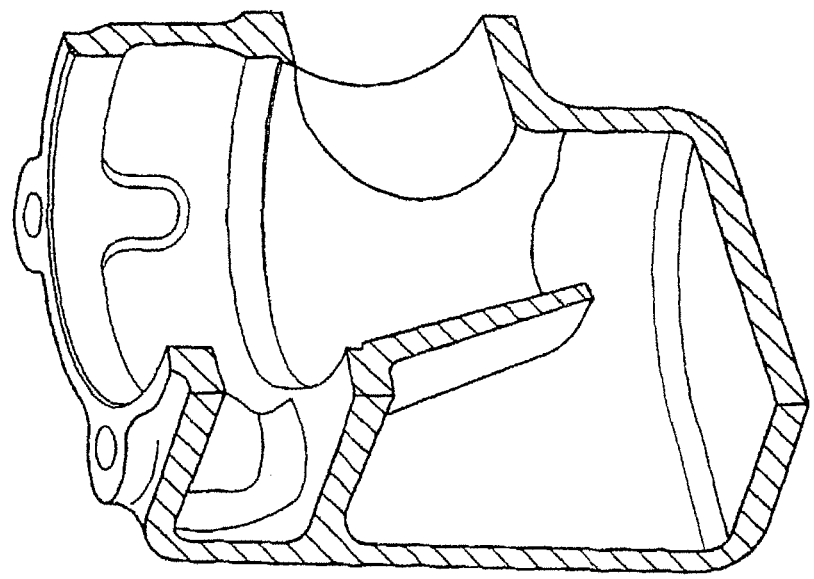
Figure 6A:
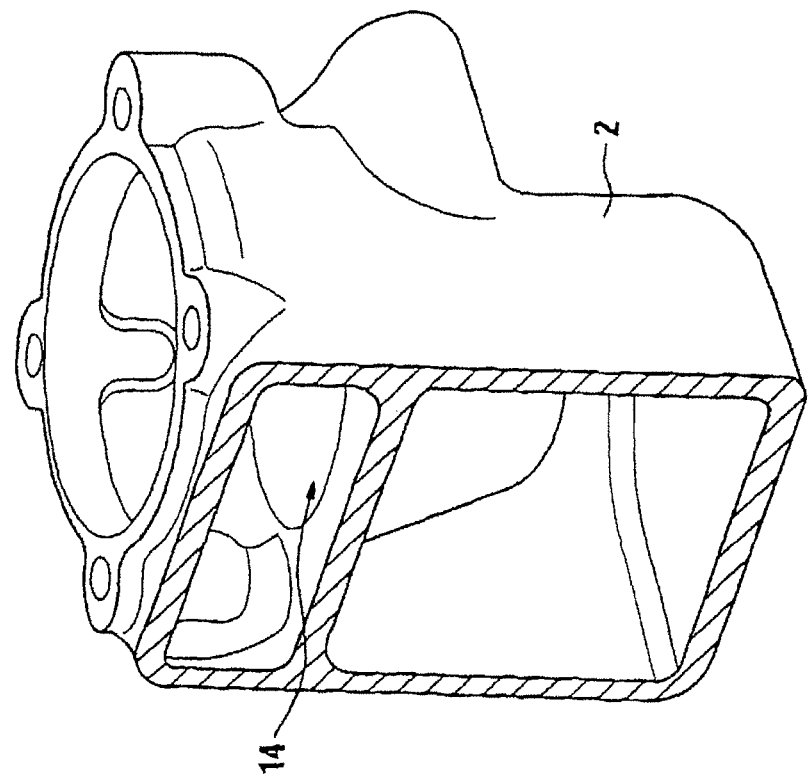

FIG. 4A shows a diagrammatic illustration to make clear the basic principle in the form of an exploded illustration of the rotary piston and the valve seat, illustrated in simplified form, FIG. 4B shows the rotary piston and valve seat of FIG. 4A in the assembled state to make clear the function of the control edge, FIG. 5 shows a regulating curve with an illustration of the valve positions, FIG. 6A, 6B show perspective illustrations of the valve housing, the illustration of FIG. 6B being illustrated in section in the longitudinal direction of the exhaust gas inlet.

Figure 7:
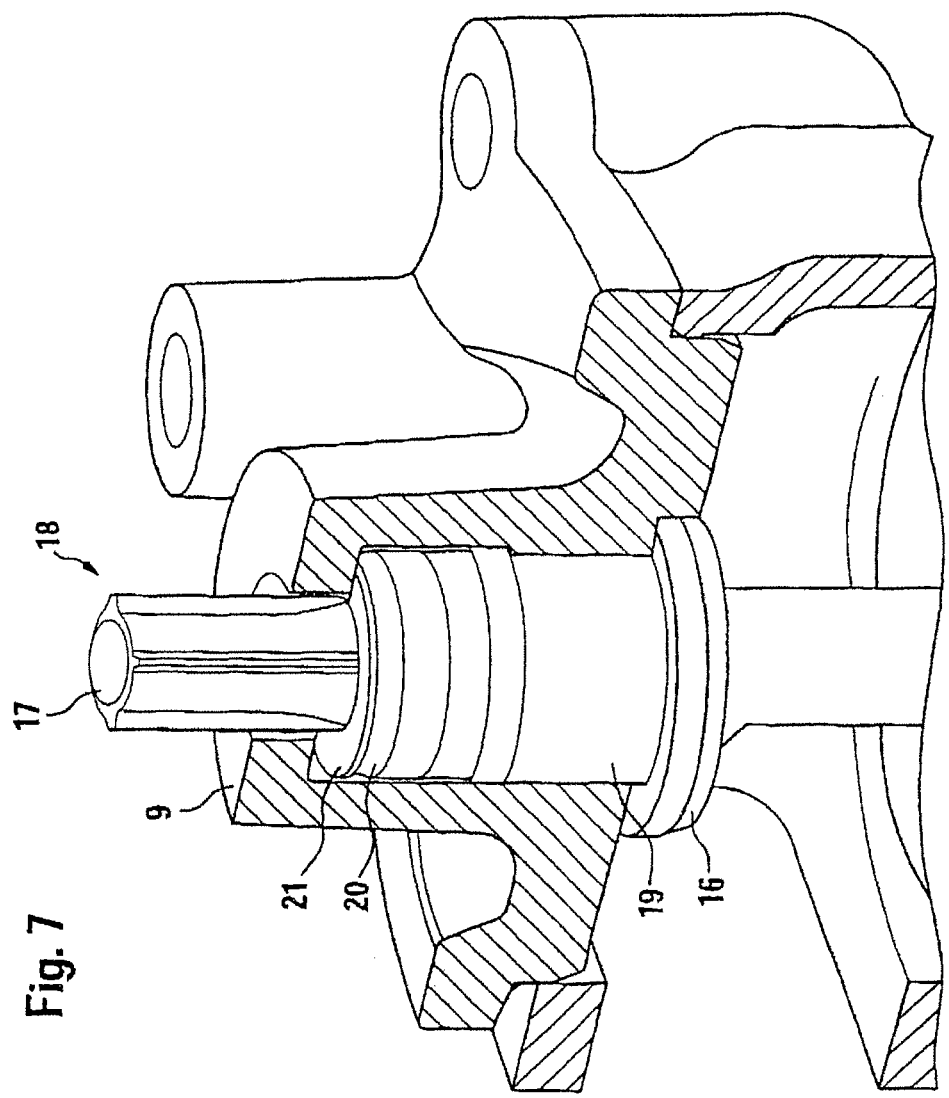
Figure 8:
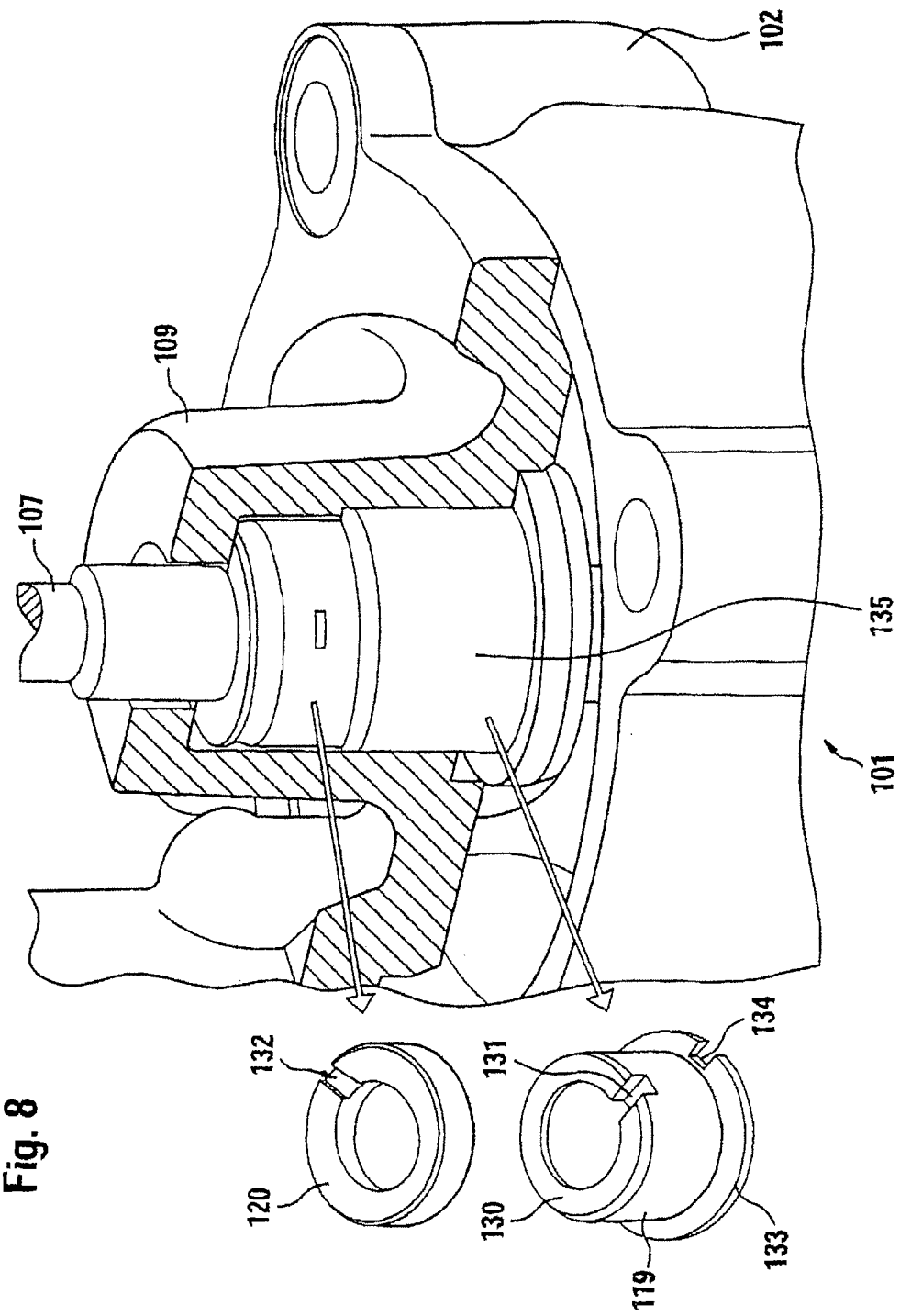
Figure 9:
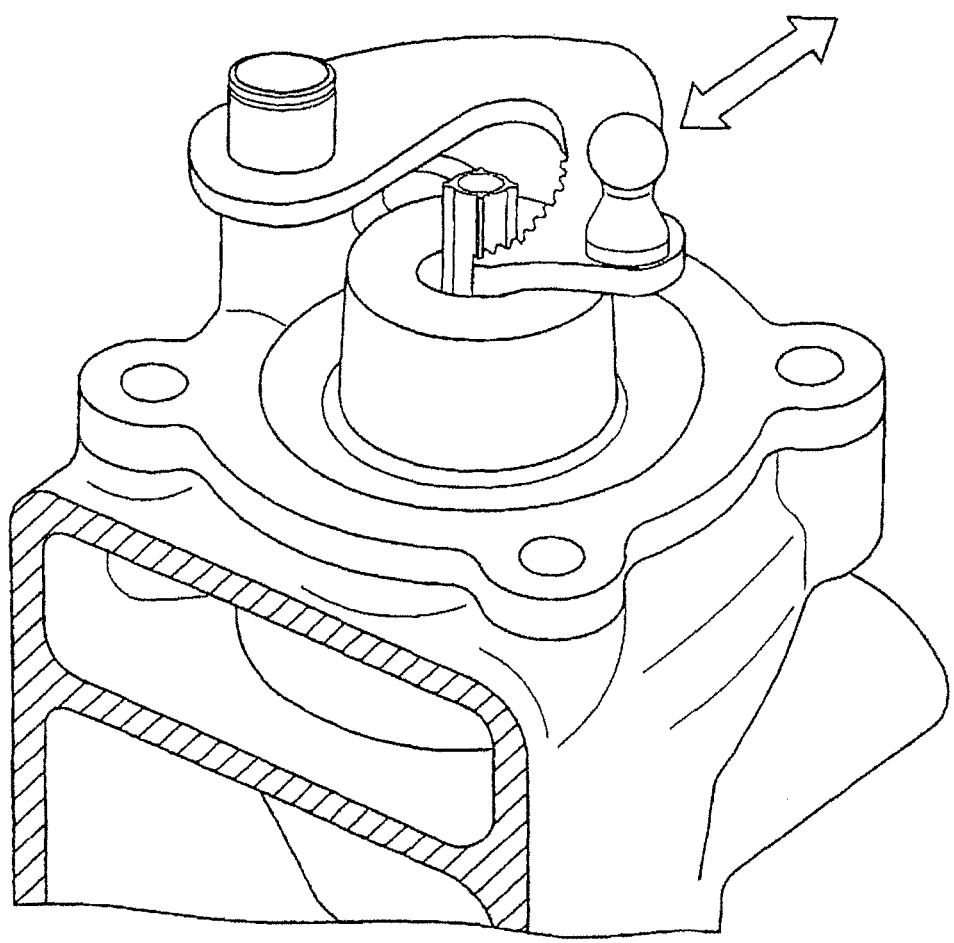
Figure 10:
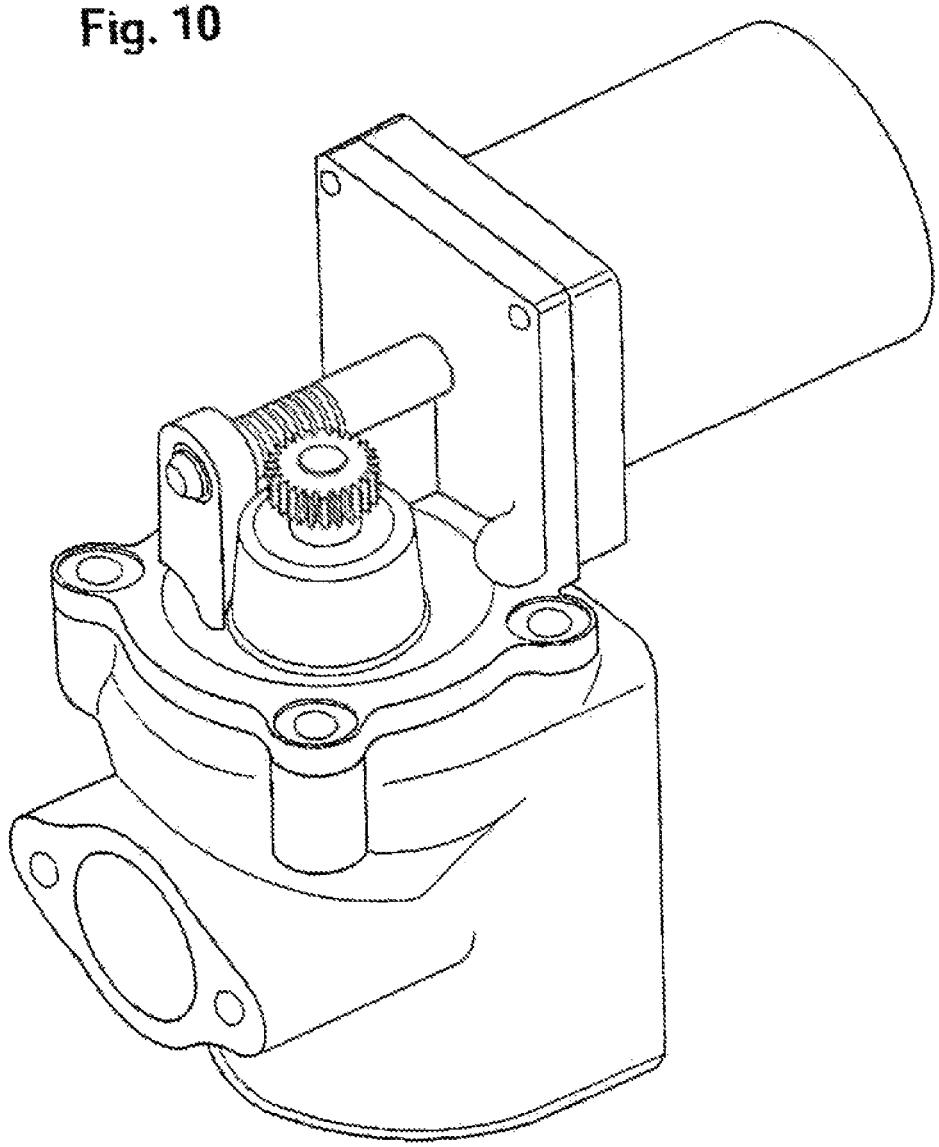

FIG. 7 shows a sectional perspective illustration of a detail of the valve stem and its guidance and sealing off, FIG. 8 shows a variant of the valve according to the invention in a perspective illustration of a detail of the valve stem and its guide, the disk and the sleeve being additionally illustrated laterally on the left in another perspective, FIG. 9 shows a perspective view of the actuation of the valve, FIG. 10 shows a perspective view of the actuation of the valve according to an alternative form of actuation, FIG. 11 shows a high-pressure exhaust gas return system with single-stage cooling which comprises a bypass, FIG. 12 shows a high-pressure exhaust gas return system with single-stage cooling having a U-flow cooler, FIG. 13 shows a high-pressure exhaust gas return system with two-stage cooling, FIG. 14 shows a low-pressure exhaust gas return system with single-stage cooling which comprises a bypass, FIG. 15 shows a low-pressure exhaust gas return system with single-stage cooling having a U-flow cooler, and FIG. 16 shows a low-pressure exhaust gas return system with two-stage cooling.

A rotary piston valve 1 for regulating the temperature and quantity of the returned exhaust gas in internal combustion engines, as is described with reference to FIG. 11 to 16 at a later juncture by means of six different applications in exhaust gas returns, which consists of a valve housing 2 and of a regulation element 3 in the form of a specially designed rotary piston, is firmly mounted with its valve housing 2 on a heat exchanger part and, according to the present exemplary embodiment, is welded thereon. In this case, mounting may also take place releasably, such as, for example, with the aid of screws. The mounting direction corresponds to the two arrows in FIG. 2 which run parallel to one another.

Figure 1:
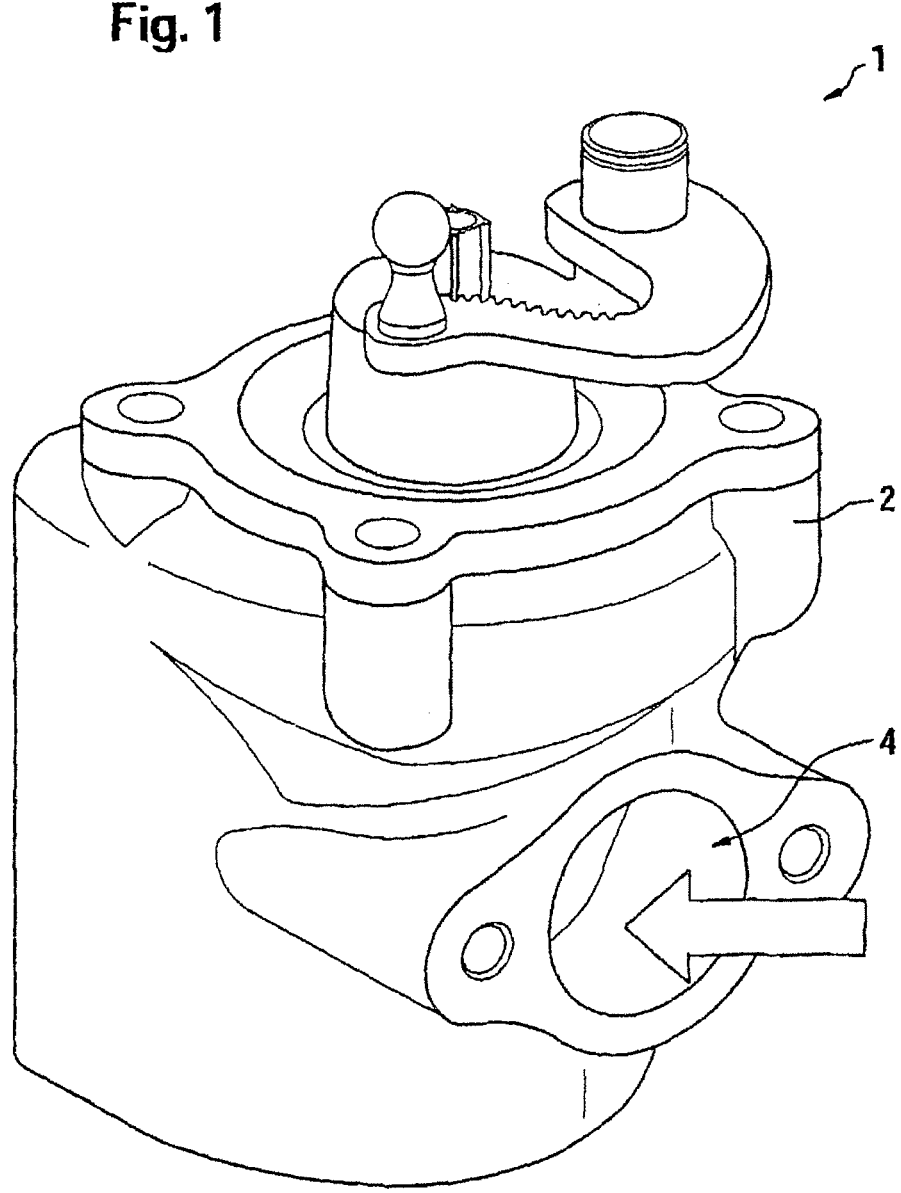
FIG. 1 shows a perspective view of a valve according to the invention.
Figure 2:
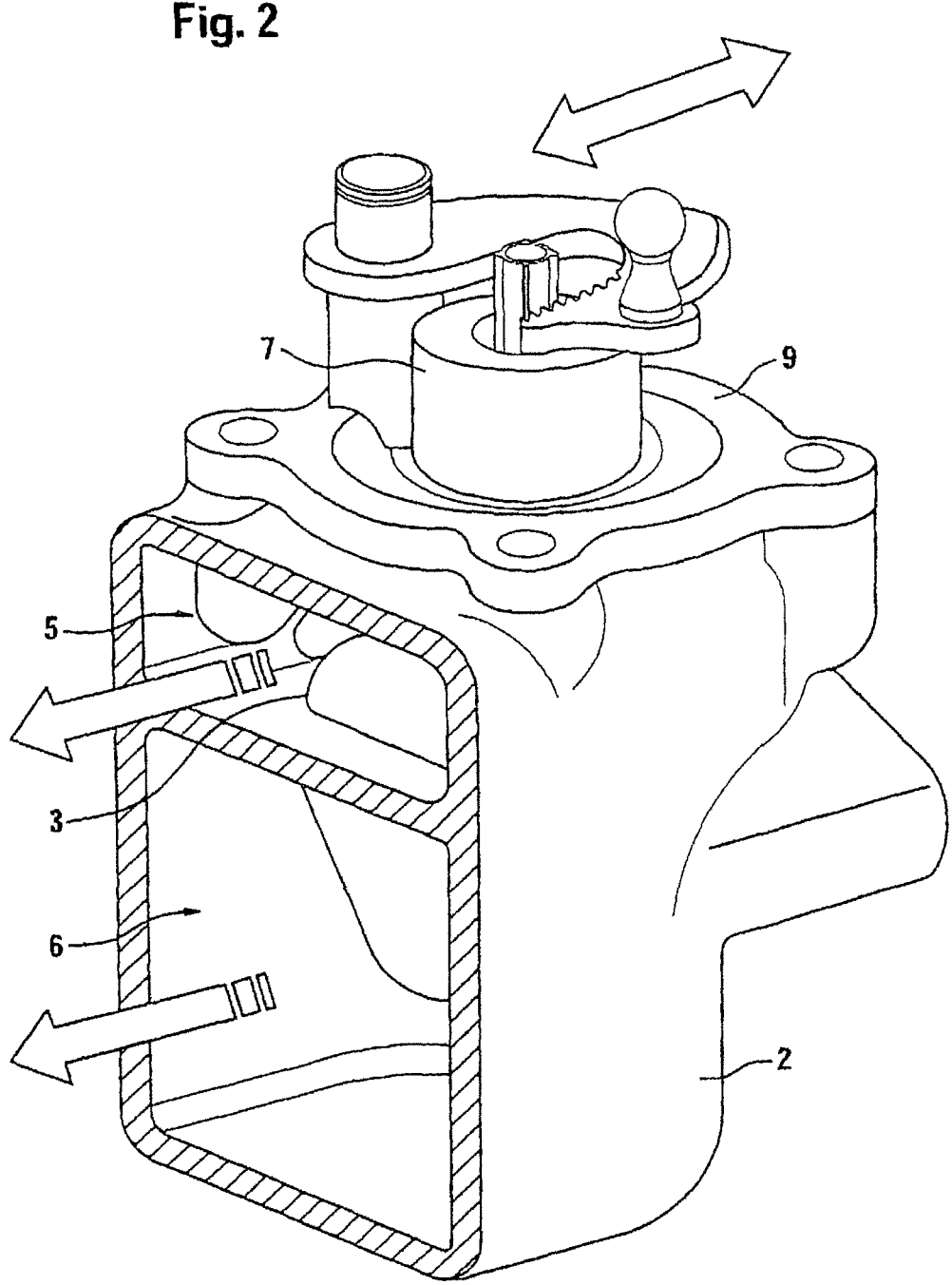
FIG. 2 shows another perspective sectional view of the valve of FIG. 1.

In the valve housing 2 are provided a first port 4 for exhaust gas inlet, indicated in FIG. 1 by an arrow, and, on the side opposite the exhaust gas inlet, two further ports, to be precise a second port 5 indicated at the top in FIG. 2 by an arrow, for the bypass, and a third port 6 indicated at the bottom in FIG. 2 by a second arrow and leading to the cooler (not illustrated).

The regulation element 3 arranged in the valve housing 2 has a valve stem 7 which is connected to an actuation device 8 for regulating the position of the regulation element 3 in the valve housing 2, illustrated at the top in FIG. 2, the actuation being indicated by a double arrow. The valve stem 7 in this case projects through a cover 9 which sealingly closes the valve housing 2 and which is screwed to the valve housing 2 by means of four screws (not illustrated). In this case, a seal (not illustrated), preferably a flat seal, is preferably provided between the valve housing 2 and the cover 9. According to the present exemplary embodiment, actuation takes place by means of a pressure-regulated vacuum cell. According to a variant illustrated in FIG. 10, actuation takes place with the aid of an electric motor, the output of which is connected to the valve stem 7 via a gear.

The regulation element 3, which has a conical surface area 10 with a vertex angle of 45°, which is arranged coaxially to the longitudinal axis of the valve stem 7, has, on the top side 11 and underside 12 closing off the conical surface area 10, in each case a profile bent according to the flow conduction requirements (cf. FIG. 3A to FIG. 3C), the edges 13 forming the control edges which, depending on the position of the regulation element 3, completely or partially release or close the ports 4, 5 and 6 in the valve housing 2. The regulation principle is illustrated in FIG. 4B in which one of the two control edges can be seen through the port. In the event of a counterclockwise rotation of the valve stem 7, the port is gradually closed, and, in the event of clockwise rotation, the port is released further until the control edge comes in front of the port again from the other side and gradually closes this.

In order sealingly to close the corresponding port or ports in the closed state, in the valve housing 2 a valve seat 14 is provided which is provided with a conical surface area 15 which is designed correspondingly to the conical surface area 11 and through which the first port 4 penetrates. The vertex angle is in the present case likewise 45°. The second port 5 is spatially connected to the region above the conical surface area 15 and the third port 6 is spatially connected to the region below the conical surface area 15.

By virtue of this configuration of the rotary piston valve 1, the regulation element 3 can perform the function of a shutoff valve and at the same time the function of a distributor flap, so that only one regulation element 3 is required. An illustration of the free cross section for the gas flow via the rotary angle of the regulation element 3 is illustrated in FIG. 5, in the upper region of FIG. 5 the rotary piston valve 1 being illustrated in section in various positions to make the configuration of the rotary piston clear, the illustrated position being identified in the diagram by an arrow at the corresponding point.

Illustrated on the left is the completely closed position, shortly before the opening of the cold air duct (that is to say, the lower third port 6), which in the present case is assigned to a rotary angle of approximately 0°. In this case, the inlet of the exhaust gas through the first port 4 is prevented due to the position of the rotary piston which completely closes the first port 4.

As is evident from the illustration, at a rotary angle of 0° to approximately 130° there is "cold" quantity regulation, that is to say the exhaust gas passes, here in an approximately linear relation between the free cross section and the rotary angle, through the first port 4 into the rotary piston valve 1 and through the third port 6 to the exhaust gas cooler. In this rotary angle range of the rotary piston, the second port 5 is completely closed on account of the profile of the upper edge 13' which in the region of the first port 4 is in bearing contact against the conical surface area 15 of the valve seat 14 above the first port 4, so that the exhaust gas is conducted solely through the lower third port 6 to the cooler. In this case, at a rotary angle of the rotary piston of approximately 110°, the free cross section is at its absolute maximum, that is to say, in this position of the rotary piston, the largest exhaust gas quantity can flow through the rotary piston valve 1, the entire exhaust gas stream in the present case being conducted solely to the exhaust gas cooler.

At a rotary angle of approximately 130° to 230°, temperature regulation takes place, that is to say the gas is conducted both through the second and through the third port 5 and 6, the lower third port 6 being closed slowly with an increase in rotary angle, and the upper second port 5 being opened slowly, and, at a rotary angle from approximately 230° to 360°, the third port 6 being completely closed. In order to make this possible, the two edges 13' and 13" are arranged so as to run in the region of the first port 4, so that it is possible for the exhaust gas to flow past upward and downward. The profile of the edges 13 is in this case designed in such a way that the free cross section remains constant over the entire angle range, so that the exhaust gas quantity flowing through the rotary piston valve 1 is also essentially constant.

At a rotary angle of above 230° to approximately 330°, "hot" quantity regulation takes place, that is to say the exhaust gas is conducted solely through the second port 5. In this rotary angle range of the rotary piston, the third port 6 is completely closed on account of the profile of the lower edge 13" which in this rotary angle range comes to bear below the first port 4, so that the exhaust gas is conducted solely through the second port 5 and therefore through the bypass, past the exhaust gas cooler to the bypass. The free cross section decreases essentially linearly as a function of the rotary angle over the angular range of "hot" quantity regulation.

As illustrated in FIG. 7, the valve stem 7 has a margin 16 of flange-like design and, at its end region 17 projecting through the cover 9, a toothing 18. A sleeve 19 and a disk 20 are pushed onto the valve stem 7 for guidance and sealing off. Above the disk 20 are arranged two cup springs 21 which bear against the inside of the cover 9 and compensate play in the valve stem longitudinal direction. The cup springs 21 consist, for example, of Inconnel or Waspalloy.

According to a preferred lower-friction variant which is illustrated in FIG. 8 and in which elements identical to or having the same action as the exemplary embodiment described above are provided below with reference symbols higher by 100, a sleeve 119 corresponding to the sleeve 19 has on its end face 130 bearing against a disk 120 a groove 131 running with beveled side walls in the radial direction. The disk 120 has itself a region 132 which projects in the direction of the sleeve 119 and which corresponds in its form to that of the groove 131.

For positioning the sleeve 119 in the valve housing 102, in a laterally projecting marginal region 133 a further groove 134 is provided, into which a projection 135 formed on the cover 109 projects, so that the sleeve 119 is seated securely in terms of rotation on the valve stem 107. Moreover, the sleeve 119 is firmly connected to the cover 109 in a way not illustrated in any more detail. The disk 120 is connected securely in terms of rotation to the valve stem 107 in a way not illustrated in any more detail.

In order to reduce the friction during a rotation of the valve stem 107, the valve stem 107 and therefore also the regulation element are slightly displaceable in the axial direction, in the present case by the amount of 0.1 mm, the surface areas of the regulation element and valve seat bearing against one another only in the closed state. The axial displaceability is made possible by the interaction of the projecting region 132 of the disk 120 fixed with respect to the valve stem and of the groove 131 in the sleeve 119 fixed with respect to the valve housing and by the resilient prestress of the cup springs 121 arranged above the disk 120 correspondingly to the first exemplary embodiment. The cup springs 121 prestress the disk 120 and therefore the valve stem 107 downward, so that the projecting region 132 is always in bearing contact with the upper end face 130 of the groove 131 of the sleeve 119. When the projecting region 132 is in bearing contact with the upper end face 130, the valve stem 107 and therefore also the regulation element are displaced upward by the amount of the height of the projecting region 132 by means of the sleeve 119 fixed with respect to the valve housing. When the projecting region 132 enters the groove 131, the valve stem 107 and therefore also the regulation element descend until the two surface areas are in complete bearing contact and the rotary piston valve 101 is completely closed.

FIG. 11 to 13 illustrate various exemplary embodiments of a high-pressure exhaust gas return system in simplified form. Identical parts are given the same reference symbols. The power of an internal combustion engine depends on the cubic capacity, the rotational speed and the mean gas pressure. By a supercharging of the engine, the filling can be improved considerably and therefore the engine power increased. The fuel/air mixture or the air is precompressed completely or partially outside the cylinder. In an engine with an exhaust gas turbo charger, the exhaust gases drive the turbine, and the latter drives the compressor. The compressor assumes intake and delivers a precompressed fresh gas charge to the engine. A charge air cooler in the charge line discharges the compression heat into the surrounding air. The cylinder filling is thereby further improved.

Exhaust gas return serves for cooling the exhaust gas as far as possible. The returned exhaust gas no longer participates in combustion in the internal combustion engine, but heats up. Overall, due to the returned exhaust gas, the temperature in the internal combustion engine or the engine is lowered. Owing to low temperatures in the engine, the generation of nitrogen oxides, which is highly dependent on the temperature in the engine, can be reduced.

The fuel/air mixture is sucked in by a compressor 1102 via an air filter 1101 and supplied to an engine 1104. The exhaust gas passes from the engine 1104 to a turbine 1106 which drives the compressor 1102. Between the engine 1104 and the turbine 1106, which is also designated as a turbo charger turbine, an extraction point 1108 is provided which is connected to a return point 1109. The exhaust gas is supplied to the engine 1104 again via the return point 1109. Between the extraction point 1108 and the return point 1109 is arranged a valve according to the invention, in particular as described with reference to FIG. 1 to 10, and which is designated below as a heat exchanger valve 1111 or else as a combination valve. The combination valve 1111 is connected to an exhaust gas cooler 1112 which comprises a bypass. This bypass is produced in one piece with the cooler housing. In a further version, not illustrated, of the invention, the bypass is designed as a separate pipeline which, in particular, bypasses the cooler. A charge air cooler 1114 is inserted between the compressor 1102 and the return point 1109.

The high-pressure exhaust gas return systems illustrated in FIGS. 12 and 13 resemble the exhaust gas return system illustrated in FIG. 11. Identical reference symbols are used to designate the same parts. In order to avoid repetition, reference is made to the above description of FIG. 11. Only the differences between the individual exemplary embodiments are dealt with below.

In the high-pressure exhaust gas return system illustrated in FIG. 12, a heat exchanger valve 1121 according to the invention, which is also designated as a combination valve, is inserted between the extraction point 1108 and the return point 1109. The combination valve 1121 is connected to a U-flow cooler. Depending on the switching position of the combination valve 1121, either the returned exhaust gas passes, uncooled, directly through the combination valve 1121 from the extraction point 1108 to the return point 1109 or the returned exhaust gas is conducted by means of the combination valve into the U-flow cooler, is cooled in the U-flow cooler 1122 and only then arrives at the return point 1109.

In the high-pressure exhaust gas return system illustrated in FIG. 13, between the extraction point 1108 and the return point 1109 is arranged a combination valve 1131 with a two-stage cooling device which comprises a high-temperature exhaust gas cooler 1132 and a low-temperature exhaust gas cooler 1133.

FIG. 14 to 16 illustrate various exemplary embodiments of a low-pressure exhaust gas return system in simplified form. The fuel/air mixture is sucked in by a compressor 1102 via an air filter 1101 and supplied to an engine 1104. The exhaust gas from the engine 1104 is expanded in a turbine 1106 which drives the compressor 1102. Downstream of the turbine 1106 is arranged an extraction point 1108 which is connected to a return point 1109. The return point 1109 is arranged upstream of the compressor 1102. A charge air cooler 1114 is inserted between the compressor 1102 and the engine 1104. A diesel particle filter 1140 with an oxidation catalyst is inserted between the turbine 1106 and the extraction point 1108. A heat exchanger valve 1141, which is also designated as a combination valve, is inserted between the extraction point 1108 and the return point 1109. The combination valve 1141 is connected to an exhaust gas cooler 1142 which is equipped with a bypass. A condensate separator 1144 is inserted between the exhaust gas cooler 1142 and the return point 1109. An exhaust gas backpressure valve 1145 is arranged after the extraction point 1108 in the flow direction. A charge air throttle 1147 is inserted between the return point 1109 and the air filter 1101.

FIGS. 15 and 16 illustrate similar low-pressure exhaust gas return systems to that in FIG. 14. The same reference symbols are used to designate identical parts. In order to avoid repetition, reference is made to the above description of FIG. 14. Only the differences between the individual exemplary embodiments are dealt with below.

In the exemplary embodiment illustrated in FIG. 15, a heat exchanger valve 1151, which is also designated as a combination valve, is inserted between the extraction point 1108 and the return point 1109. The combination valve 1151 is connected to a U-flow cooler 1152. Depending on the switching position of the combination valve 1151, either the returned exhaust gas passes, uncooled, directly through the combination valve 1151 from the extraction point 1108 to the return point 1109 or the returned exhaust gas is conducted into the U-flow cooler 1152 by means of the combination valve, is cooled in the U-flow cooler 1152 and only then arrives at the return point 1109.

In the exemplary embodiment illustrated in FIG. 16, between the extraction point 1108 and the return point 1109 is arranged a combination valve 1161 with a two-stage cooling device which comprises a high-temperature exhaust gas cooler 1162 and a low-temperature exhaust gas cooler 1163.

The invention claimed is:

1. A valve configured to regulate a temperature and a quantity of returned exhaust gas in an internal combustion engine, comprising:
   a valve housing; and
   a regulation element,
   wherein the regulation element is configured to regulate a throughflow of a fluid in cooperation with a conical valve seat formed in the valve housing,
   wherein the regulation element is mounted rotatably in the valve housing,
   wherein the regulation element is arranged on a valve stem, and the valve stem projects through a fixed sleeve that is fixed with respect to the valve housing,
   wherein the regulation element comprises a top side, an underside, and a conical surface area arranged between the top side and the underside, and
   wherein the regulation element is configured to conduct the fluid past the top side only at a first angular position in the valve housing, conduct the fluid past the underside only at a second angular position in the valve housing, conduct the fluid past both the topside and the underside at a third angular position in the valve housing, and completely shut off a fluid inlet port at a fourth angular position in the valve housing.

2. The valve of claim 1, wherein at least one spring is arranged on the valve stem.

3. The valve of claim 1, wherein each of the top side, the underside, and the conical surface area are separated from one another by an edge.

4. The valve of claim 1, wherein the top side and the underside are formed by curved surfaces.

5. The valve of claim 1, wherein the conical valve seat has a conical surface area, and a vertex angle of the conical surface area of the valve seat is same as a vertex angle of the conical surface area of the regulation element.

6. The valve of claim 1, wherein a vertex angle of the conical surface area of the regulation element ranges between 30° to 90°.

7. The valve of claim 1, wherein the regulation element is displaceable in a longitudinal direction of the valve housing.

8. The valve of claim 7, wherein the regulation element is displaceable in the longitudinal direction of the valve housing by an amount of at most 0.5 mm.

9. The valve of claim 7, wherein the regulation element is configured to bear against the valve seat only when a fluid inlet port is completely shut off by the regulation element, and wherein the regulation element is configured to be slightly removed from the valve seat in the longitudinal direction when the fluid inlet port is not completely shut off.

10. The valve of claim 1, wherein the valve is actuated with aid of a pressure-regulated vacuum cell or an electric motor.

11. An exhaust gas return system comprising:
    an internal combustion engine with an extraction point from which exhaust gas is extracted from an engine exhaust system, and a return point at which exhaust gas is supplied to an engine intake system; and
    a heat exchanger valve device comprising a valve,
    wherein the valve comprises a valve housing and a regulation element,
    wherein the regulation element is configured to regulate a throughflow of a fluid in cooperation with a conical valve seat formed in the valve housing,
    wherein the regulation element is mounted rotatably in the valve housing,
    wherein the regulation element comprises a top side, an underside, and a conical surface area arranged between the top side and the underside,
    wherein the regulation element at different angular positions in the valve housing is configured to conduct the fluid past the top side only, conduct the fluid past the underside only, conduct the fluid past both the topside and the underside, and completely shut off a fluid inlet port, and
    wherein the valve is inserted between the extraction point and the return point.

12. The exhaust gas return system of claim 11, wherein the heat exchanger valve device is connected to an exhaust gas cooling device.

13. The exhaust gas return system of claim 11, wherein the heat exchanger valve device is integrated into an exhaust gas cooling device.

14. The exhaust gas return system of claim 11, wherein the heat exchanger valve device is connected to an exhaust gas cooling device in a materially integral manner.

15. The exhaust gas return system of claim 11, further comprising an exhaust gas cooling device, wherein the exhaust gas cooling device includes a bypass.

16. The exhaust gas return system of claim 11, further comprising an exhaust gas cooling device, wherein the exhaust gas cooling device is a U-flow cooler.

17. The exhaust gas return system of claim 11, further comprising an exhaust gas cooling device, wherein the heat exchanger valve device is upstream of the exhaust gas cooling device, along a flow direction from the extraction point to the return point.

18. The exhaust gas return system of claim 11, further comprising an exhaust gas cooling device, wherein the heat exchanger valve device is downstream of the exhaust gas cooling device, along a flow direction from the extraction point to the return point.

19. The exhaust gas return system of claim 11, further comprising a high-temperature exhaust gas cooler and a low-temperature exhaust gas cooler.

20. The exhaust gas return system of claim 11, further comprising a high-temperature exhaust gas cooler and a low-temperature exhaust gas cooler, wherein the heat exchanger valve device is upstream or downstream of the high-temperature exhaust gas cooler or of the low-temperature exhaust gas cooler, along a flow direction from the extraction point to the return point.

21. The exhaust gas return system of claim 11, wherein the exhaust gas return system is a high-pressure exhaust gas return system.

22. The exhaust gas return system of claim 11, wherein the exhaust gas return system is a low-pressure exhaust gas return system.

23. A valve configured to regulate a temperature and a quantity of returned exhaust gas in an internal combustion engine, comprising:
    a valve housing, and
    a regulation element,
    wherein the regulation element is configured to regulate a throughflow of a fluid in cooperation with a valve seat formed in the valve housing,
    wherein the regulation element is mounted rotatably in the valve housing, has a conical surface area, and is arranged on a valve stem,
    wherein the valve stem projects through a fixed sleeve that is fixed with respect to the valve housing,
    wherein the fixed sleeve comprises an end face with at least one groove that runs in a radial direction, and wherein the groove cooperates with a projecting region of a disk that is fixed to the valve stem in terms of rotation.

24. The valve of claim 23, wherein a contour of the at least one groove is configured to correspond to the projecting region.

25. A valve configured to regulate a temperature and a quantity of returned exhaust gas in an internal combustion engine, comprising:
- a valve housing; and
- a regulation element,
- wherein the regulation element is configured to regulate a throughflow quantity of a fluid in cooperation with a valve seat formed in the valve housing,
- wherein the regulation element is mounted rotatably in the valve housing,
- wherein the regulation element and the valve seat are configured to regulate the throughflow quantity of the fluid from a first port, such that:
  - in a first angular position range, a second port is closed, and a free cross section of a third port is altered,
  - in a subsequent second angular position range, the fluid throughflow quantity is distributed to the second port and the third port, and
  - in a following third angular position range, a free cross section of the second port is altered, and the third port is completely closed;
- wherein a relationship between an angular position of the regulation element and a cross section of the first port provided for the throughflow quantity of the fluid is essentially linear in the first angular position range, in the third angular position range, or in both the first and third angular position ranges.

26. A valve configured to regulate a temperature and a quantity of returned exhaust gas in an internal combustion engine, comprising:
- a valve housing, and
- a regulation element,
- wherein the regulation element is configured to regulate a throughflow quantity of a fluid in cooperation with a valve seat formed in the valve housing,
- wherein the regulation element is mounted rotatably in the valve housing,
- wherein the regulation element and the valve seat are configured to regulate the throughflow quantity of the fluid from a first port, such that:
  - in a first angular position range, a second port is closed, and a free cross section of a third port is altered,
  - in a subsequent second angular position range, the fluid throughflow quantity is distributed to the second port and the third port, and
  - in a following third angular position range, a free cross section of the second port is altered, and the third port is completely closed;
- wherein there is an absolute maximum of a cross section of the first port provided for the throughflow quantity of the fluid between the first angular portion range and the second angular position range.

27. A valve configured to regulate a temperature and a quantity of returned exhaust gas in an internal combustion engine, comprising:
- a valve housing; and
- a regulation element,
- wherein the regulation element is configured to regulate a throughflow quantity of a fluid in cooperation with a valve seat formed in the valve housing,
- wherein the regulation element is mounted rotatably in the valve housing,
- wherein the regulation element and the valve seat are configured to regulate the throughflow quantity of the fluid supplied to the valve through a first port, such that:
  - in a first angular position range, a second port is closed, and a free cross section of a third port is altered,
  - in a subsequent second angular position range, the fluid throughflow quantity is distributed to the second port and the third port, and
  - in a following third angular position range, a free cross section of the second port is altered, and the third port is completely closed;
- wherein a total cross section of the first port provided for the throughflow quantity of the fluid is essentially constant in the second angular position range.

* * * * *